(12) United States Patent
Bucalo (10) Patent No.: US 8,350,486 B2
(45) Date of Patent: Jan. 8, 2013

(54) ILLUMINATED SAFETY HELMET (76) Inventor: Louis R. Bucalo, Lauderdale By The Sea, FL (US)

( * ) Notice: Subject to any disclaimer, the term of this patent is extended or adjusted under 35 U.S.C. 154(b) by 442 days.

(21) Appl. No.: 12/688,257

(22) Filed: Jan. 15, 2010

(65) Prior Publication Data

US 2010/0181940 A1 Jul. 22, 2010

Related U.S. Application Data (60) Provisional application No. 61/205,514, filed on Jan. 21, 2009.

(51) Int. Cl.
*H05B 37/02* (2006.01)
*F21V 21/084* (2006.01)

(52) U.S. Cl. .................. 315/209 R; 315/360; 362/106; 362/249.05

(58) Field of Classification Search .............. 315/185 R, 315/209 R, 291, 313, 360; 362/394, 106, 362/191, 249.04, 249.05, 398
See application file for complete search history.

(56) References Cited

U.S. PATENT DOCUMENTS

| | | |
|---|---|---|
| 4,559,586 A | 12/1985 | Slarve |
| 4,817,212 A | 4/1989 | Benoit |
| 4,862,331 A | 8/1989 | Hanabusa |
| 4,901,210 A | 2/1990 | Hanabusa |
| 4,945,458 A | 7/1990 | Batts et al. |
| 4,958,264 A | 9/1990 | Evendon |
| 5,207,500 A | 5/1993 | Rios et al. |
| 5,327,587 A | 7/1994 | Hurwitz |
| 5,357,409 A | 10/1994 | Glatt |
| 5,416,675 A | 5/1995 | DeBeaux |
| 5,479,325 A | 12/1995 | Chien |
| 5,508,900 A | 4/1996 | Norman |
| 5,559,680 A | 9/1996 | Tabanera |
| 5,570,946 A | 11/1996 | Chien |
| 5,588,736 A | 12/1996 | Shea, Sr. |
| 5,743,621 A | 4/1998 | Mantha et al. |
| 5,758,947 A | 6/1998 | Glatt |
| 5,810,467 A | 9/1998 | Hurwitz |
| 5,871,271 A | 2/1999 | Chien |
| 5,931,559 A | 8/1999 | Pfaeffle |
| 6,007,213 A | 12/1999 | Baumgartner |
| 6,113,244 A | 9/2000 | Baumgartner |
| 6,244,721 B1 | 6/2001 | Rodriguez et al. |
| 6,325,521 B1 | 12/2001 | Gregg et al. |
| 6,326,734 B1 | 12/2001 | Gahwiler |
| 6,439,733 B1 | 8/2002 | Fischer et al. |

(Continued)

OTHER PUBLICATIONS

Iowa State University, Synthesis of Best Practice for Increasing Protection and Visibility of Highway Maintenance Vehicles, Sponsored by the Iowa Department of Transporation and the Iowa Highway Research Board, Final Report, Aug. 2002, 26 pages.

*Primary Examiner* — Jimmy Vu
(74) *Attorney, Agent, or Firm* — Leason Ellis LLP (57) ABSTRACT

Illuminated safety helmets are provided. The helmets include a shell having two or more lighted zones mounted therein, which are spaced from each other on the outer surface of the shell. One or more of the lighted zones can be selectively deactivated, allowing a wearer to control which zone or zones not to illuminate, as may be desirable in certain situations. Each zone, when activated, is illuminated in a variable fashion, such that the light illuminated from the zone changes within a brief period of time.

19 Claims, 8 Drawing Sheets

U.S. PATENT DOCUMENTS

| | | |
|---|---|---|
| 6,464,369 B1 | 10/2002 | Vega et al. |
| 6,497,493 B1 | 12/2002 | Theisen |
| 6,720,870 B2 | 4/2004 | Morse |
| 6,784,795 B1 | 8/2004 | Pories et al. |
| 6,982,633 B2 * | 1/2006 | Burdick .................. 340/432 |
| 7,121,676 B1 | 10/2006 | Kutnyak |
| 7,128,434 B1 | 10/2006 | Nally et al. |
| 7,221,263 B2 * | 5/2007 | Moore et al. ................ 340/427 |
| 7,311,413 B1 | 12/2007 | Barnes |
| 2002/0118534 A1 | 8/2002 | Fischer et al. |
| 2004/0052068 A1 | 3/2004 | Chien et al. |
| 2005/0265015 A1 | 12/2005 | Salazar |
| 2006/0198122 A1 | 9/2006 | Senter et al. |
| 2006/0232955 A1 | 10/2006 | Labine |
| 2007/0019399 A1 | 1/2007 | Harris |
| 2007/0025100 A1 | 2/2007 | Caruana |
| 2007/0097668 A1 | 5/2007 | Choi |
| 2008/0066218 A1 | 3/2008 | Loizzo |
| 2008/0068825 A1 | 3/2008 | Harris |
| 2008/0080171 A1 | 4/2008 | Lombard et al. |
| 2008/0084688 A1 | 4/2008 | White |
| 2008/0170382 A1 | 7/2008 | Mass et al. |
| 2008/0266838 A1 | 10/2008 | Lin |
| 2009/0034238 A1 | 2/2009 | Hurwitz |
| 2009/0073679 A1 * | 3/2009 | Wainright .................. 362/191 |
| 2009/0086468 A1 | 4/2009 | Carillo |
| 2009/0180278 A1 | 7/2009 | Cheng et al. |

* cited by examiner

ILLUMINATED SAFETY HELMET

CROSS REFERENCE TO RELATED APPLICATIONS

This application claims the benefit of and priority to U.S. Provisional Patent Application Ser. No. 61/205,514, filed on Jan. 21, 2009, the entirety of which is expressly incorporated by reference herein.

BACKGROUND OF THE INVENTION

1. Field of the Invention

The present invention relates to protective headwear, and more particularly to helmets that enhance the visibility of the wearer to others that are in the vicinity of the helmet wearer.

2. Discussion of the Related Art

The numerous benefits of protective headwear or helmets have been known for some time. For example, workers and other persons at certain physically hazardous jobsites have long been required to wear helmets, as have participants in many contact sports. As another example, some states require motorcyclists to wear helmets while operating their motorcycles in such jurisdictions. More recently, the importance of wearing helmets has been recognized and continues to gain more acceptance for various activities such as, for example, road and off-road bicycling, skiing, snowboarding, inline skating, roller skating, and/or other activities.

Extensive efforts have gone into improving helmet technologies. Such improvements have notably increased the ability of helmets to absorb energy during crashes, collisions, or other helmet impacts. This can reduce severity or, in some cases, even prevent head injuries during such events. Although such technological improvements to helmets may reduce severity of or prevent some head injuries, they do little to actually prevent crashes, collisions, or other helmet impacts from occurring in the first place.

At times, crashes or collisions occur because the individuals were not seen at all or soon enough by the other individual or individuals in the collision. This can occur on roadways when other roadway users do not notice a motorcyclist, bicyclist, or other roadway user. This can also occur at other, non-roadway locations if, for example, an off-road bicycle trail rider is unable to see other trail riders, or a skier or snowboarder is unable to see other skiers or snowboarders, during low light conditions or other periods of poor-visibility.

In efforts to reduce such incidents, attempts have been made to increase the visibility of helmet wearers to others by incorporating, for example, bright colors, reflective materials, and/or lights, into helmets and/or other apparel of the non-automobile vehicle users. Specifically regarding previous attempts for incorporating lights into helmets, even though such previous attempts have been at least somewhat successful and beneficial, these previous designs are typically rather complex and expensive to make. In addition, such previous helmets have not incorporated an appropriate means of illumination to more successfully present a visual signal that is quickly and easily noticed by others in the vicinity of the helmet wearer, in both daylight and nighttime conditions. Specific utilization of such a visual signal is essential to the utility of a helmet incorporating lights in potentially preventing some collisions. This lack of appropriate visual signal is potentially the reason that government studies to date have not demonstrated utility of current helmet lights in preventing bicycle accidents. Accordingly, previous helmets that incorporated lights have found only modest commercial success, whereby further technological developments could prove desirable.

Some previous attempts of incorporating lights into helmets have included high-powered head lamps that are configured to help the wearer see during times of low ambient lighting. These head lamps consume a lot of power, are primarily configured to improve a wearer's ability to see straight ahead during low-light conditions, although such configurations may only marginally improve the wearer's ability to see during such conditions, and can only be seen by others if they are in front of the wearer of the helmet.

Other previous attempts include turn signals, brakes lights, and/or constantly illuminated taillights that are incorporated into helmets either in addition to or in place of the previously described headlights. Here too, such systems consume a lot of power and these also have to be integrated into the electronic system of, for example, the wearer's motorcycle in a manner that allows the lights of the helmet to illuminate in unison with the turn signal indicators and/or brake lights of the motorcycle. Integrating a helmet as a motorcycle lighting component in this manner typically requires the helmet to be physically and electronically tethered to the motorcycle's electronics system. This increases system complexity and can require a wiring harness that attaches the helmet to the motorcycle, which may dangle in the view of and/or otherwise disturb the wearer.

Other attempts of incorporating lights into motorcycle helmets also require wiring harnesses that connect the helmets to the electronics systems of the motorcycles, because the lighting systems use large amounts of power, making operating such systems on battery power alone, difficult or wholly impractical. For example, various attempts have been made to illuminate large surface areas of helmets with numerous lights or with large electroluminescent panels that cover such large surface areas. Many of these systems also require complex and expensive components such as, for example, DC to AC power inverters that may also be undesirably bulky and heavy for implementation into helmets.

Other attempts at providing helmets with integrated lights tend to use large amounts of power because they are continuously energized while being worn. For example, some such helmets have lights that automatically turn on or illuminate when the helmets are put on by their wearers. To accomplish this, switches for energizing the lights have previously been incorporated into chinstrap clasps or incorporated as pressure-activated switches in the interiors of helmets. In both situations, with clasp or interior switches, the lights turn on when the wearer puts the helmet on and the lights stay illuminated the entire time that the helmet is being worn.

However, there are times when wearers may not want their helmets to be illuminated, even though they are wearing them. For example, if helmet-wearing motorcyclists are refueling their motorcycles, they may want to talk to each other but may also want to leave their helmets on. However, illuminated helmets may be a distraction during such conversations, or may otherwise be considered undesirable in that situation. As another example, if helmet-wearing bicyclists are taking a break from riding to consult a map and hold a conversation, illuminated helmets may be a distraction during such conversations, or may otherwise be considered undesirable in that situation. As yet another example, when helmet-wearing skiers are riding up a hill on a chairlift together, illuminated helmets may be a distraction or may otherwise be considered undesirable during the chairlift ride.

In light of the foregoing, an illuminated helmet is desired that improves the state of the art by overcoming various ones of the aforesaid problems of the prior art.

SUMMARY OF THE INVENTION

The present invention provides illuminated helmets that overcome the aforementioned drawbacks. One aspect of the invention includes an illuminated helmet that presents a visual signal that is quickly and easily noticed by others in the vicinity of the helmet wearer, in both daylight and nighttime conditions, in a manner that potentially prevents some collisions between the helmet wearer and others in the vicinity of the helmet wearer. Such an appropriate visual signal enhances the visibility of the helmet wearer and is provided by an appropriate means of illumination that is not awkward or gaudy in appearance, whereby the illuminated helmets in their entireties do not appear awkward or gaudy. This correspondingly provides a benefit of promoting, encouraging, and/or otherwise facilitating, widespread use and acceptance of lighted helmets that would improve safety for motorcycle riders, bicycle riders, skiers, and other safety helmet wearers, because such illuminated safety helmets do not appear awkward, gaudy, or otherwise be undesirable in appearance, which has not been achieved by the numerous prior art attempts.

In accordance with one aspect of the invention, an illuminated helmet is provided that overcomes various problems associated with the prior art by including multiple lighted zones such that a light signal can be seen from all viewing angles about the helmet, and one or more such zones can be selectively deactivated in special situations in which emitting light from such deactivated zone(s) might be considered undesirable in that particular situation.

According to one aspect of the invention, the illuminated helmet is configured to allow, for example, a pair of motorcyclists that are riding a single motorcycle to emit light from lighted zones of their two helmets, collectively, in directions that are visible from all viewing angles about the pair of motorcyclists, without having to emit light toward each other. In other words, the driver can deactivate a rearward lighted zone and the two-up riding passenger can deactivate a forward lighted zone. In so doing, the driver and passenger do not emit light toward each other, while ensuring that the driver and passenger in combination are visible to others from all angles by emitting light from the remaining lighted zones on their two helmets, e.g., from a forward lighted zone of the driver, a rearward lighted zone of the passenger, and side lighted zones of both the driver and passenger.

According to another aspect of the invention, the illuminated helmet is configured to allow a pair of skiers that are riding next to each other on a chairlift to deactivate all of the lighted zones of their helmets during the chairlift ride without removing their helmets, or similarly deactivate the side lighted zones that face each other for the duration of the ride.

According to yet another aspect of the invention, the illuminated helmet is configured to allow a pair of bicyclists that are stopped on a trail and talking to each other to deactivate their forward lighted zones of their helmets. In so doing, if they are facing and talking to each other, the helmets do not emit light toward each other while ensuring that the pair of bicyclists, together, remains visible to other trail riders from all viewing angles about the pair of bicyclists.

In a first family of embodiments, a helmet is provided that has two or more zones or discrete areas that contain lights, LEDs, or other means of emanating visible light, which are visually conspicuous while they are activated, energized or illuminated, enhancing visibility of the helmet wearer to others from all viewing angles about the perimeter of the wearer, while allowing separate deactivation of one or more of the lighted zones, as may be desirable, for example, in special situations or circumstances. The lighted zones can be, for example, provided upon quadrants of the helmet and can be collectively or individually activated or deactivated, allowing a wearer of the helmet to select the direction or directions from which to deactivate emission of light as may be desirable under certain situations or circumstances.

In accordance with another aspect of the invention, each lighted zone, when activated, is illuminated in a variable manner, with such variability comprising (i) a change in the number of points, regions, or discrete areas of illumination within a zone and/or, (ii) a change in the location of points, regions, or discrete areas of illumination within a zone and/or, (iii) a change in the colors that are simultaneously illuminated within a zone. Such change is manifest within a brief period of time and therefore can be observed when an activated zone is viewed for a brief period of time. The brief period of time may be as long as about five seconds, or alternatively less than five seconds, for example, about one second or one-half second.

In accordance with another aspect of the invention, the illumination within each activated zone varies in more than one regard within a brief period of time of about five seconds, or less than five seconds, such as about one-half second. The illumination in each activated zone may vary by changing at least two of the following within the zone, (i) the color or colors of light emission, (ii) the location of light emission, (iii) the intensity of light emission, or (iv) the rate of alternating between light emission and non-emission. Variability of at least two of the above parameters in any activated zone may provide increased utility in commanding the attention of individuals in the vicinity of the helmet wearer.

In accordance with another aspect of the invention, each lighted zone, when activated, may blink, flash, alternate, or otherwise variably illuminate at least two different colors, such that the variability occurs within a brief period of time, and therefore can be observed if a zone is viewed for a brief period of time. Each of the lighted zones may include multiple lights of different colors that alternatingly flash or otherwise display non-continuous illuminating signals that vary their color outputs. In this configuration, from all viewing directions about or around the perimeter of the wearer of the helmet, a light signal is visible that more easily attracts attention in at least two regards, (i) being more easily perceptible by having a non-constant or variable pattern of illumination that is manifest and can be perceived over a brief time interval, such variable pattern being defined as a change in the number and/or location of points, regions, or discrete areas of illumination within a zone and (ii) being more easily perceptible by presenting within each activated zone at least two different schemes of simultaneously illuminated color(s), such that both color schemes occur during a brief time interval. For example, with regard to (ii) above, an activated zone may simultaneously display the colors white and blue (color scheme 1), and then change to simultaneously display the colors white and green (color scheme 2), such that both of the two different color schemes occur within a brief time interval. Alternatively, an activated zone may display only the color white (color scheme 1), and then change to display only the color blue (color scheme 2), such that both different color schemes occur within a brief period of time. Yet alternatively, an activated zone may display only the color green (color scheme 1), and then change to display the colors green and white simultaneously (color scheme 2), such that both color schemes occur within a brief period of time. Alternatively, an activated zone may display only the color red (color scheme 1), then change to display only the color white (color scheme 2), and then change to display only the color blue (color scheme 3), such that at least two of the three color schemes occur within a brief time interval. The brief time interval can be up to about five seconds, or less than about five seconds such as, for example, about one second or one-half second.

Such display or light-emitting characteristics may render the helmet more visible when compared to, for example, a constantly illuminated light source that could easily be lost in a group of lights in street or highway traffic which may correspondingly fail to grab the attention of pedestrians and other motorists, or a monochrome blinking light source.

In some preferred embodiments of the current invention, an activated zone varies the colors it is simultaneously illuminating, and this change in color illumination occurs within a brief time interval of about five seconds or less. In some embodiments of the invention, each zone may contain three total colors for illumination and only one color is illuminated at a given time when the zone is activated, such that over a brief time interval at least two, or all three, colors are illuminated in sequence. In some embodiments of the invention, the total number of illuminated colors in a zone may be two.

The particular flashing pattern, frequency or duration(s) of illumination and non-illumination, and/or other display characteristics may also be selectable by the wearer, by way of a user input or user interface device that may include a selector that can be configured as, for example, a button, a switch, and/or other user input or user interface device.

In accordance with another aspect of the invention, the light activation switch, the configuration selector, and other components of the user interface device are provided at locations on the outer surface of the helmet that allow them to be easily manipulated by the helmet wearer while the helmet is being worn. In some preferred embodiments, the light activation switch and configuration selector switch are located near the bottom of the right and/or left sides of the outer surface of the helmet. These components cooperate with a flasher system, processor, and/or other circuit components for controlling the display characteristics, allowing the user to select the desired mode of operation at a particular time, and/or for turning the lighting system on and off entirely. Placement of the light activation switch and configuration selector in such locations permits the wearer to easily turn the lights on and off, and deactivate specific zones without removing the helmet, a potentially important practical utility in many situations.

In accordance with another aspect of the invention, the lighted zones can be selectively and individually activated or deactivated, as desired. This allows wearers of the helmets to determine from which direction(s) they wish to deactivate conveyance of the light signal(s), in other words, which of the lighted zones to deactivate, as may be desirable in certain circumstances. In accordance with another aspect of the invention, each of the lighted zones displays more than one color, for example, emits different or varying colored lights by way of a single bulb or device, while according to other aspects, separated bulbs or devices are used for emitting the different colored lights. For example, and according to some aspects of the invention, multiple lights are provided within each of the lighted zones. The multiple lights can include a single light for each of the colors that the lighted zone emits or can include multiple lights for each of the emitted colors. Regardless, the multiple lights of the lighted zones can be aligned with each other horizontally or vertically, or be spaced from each other so as to define a geometric shape, or otherwise be provided, within the lighted zones. As desired, the lights can be provided in the helmet in a manner that facilitates their accessibility and replacement.

In accordance with anther aspect of the invention, the multiple lights may be LEDs (light emitting diodes) or other suitable light-displaying device, noting that the lights of some implementations may display a somewhat small but preferably discrete and highly intense light. The individual lights may each have luminous intensity values of between about 100 mcd (millicandela) to about 18,000 mcd or greater, preferably between about 5,000 mcd and about 18,000 mcd or greater for allowing enhanced visibility in daylight conditions.

In accordance with another aspect of the invention, a flashing system controls the display of the flashing and multiple colored illuminations from the lighted zones. The flashing system can be a stand-alone system or incorporated into bulbs of the lighted zones, for example, by providing blinking or flashing LEDs, or otherwise.

In accordance with another aspect of the invention, each of the lighted zones is spaced from each other by a distance sufficient to define separate zones when all the zones are activated, whereby each lighted zone appears as a generally separate illuminated display that varies, and is not confluent with the other lighted zones. Notwithstanding, the lighted zones may be provided at each of four definable quadrants of the helmet, for example, the front, back, and two lateral sides, so that at least one lighted zone is visible from all angles of view as seen from a 360-degree traverse about the perimeter of the helmet. Alternatively, this allows other roadway users, and/or others in the vicinity of the helmet wearer, to be able to see at least one lighted zone of the helmet, regardless of where such other individual is positioned with respect to the helmet wearer. Such quadrant placement of the lighted zones or the placement of the lights upon such four designated areas may provide to pedestrians, cyclists, and motorists at all sides and in front of and behind the user significant additional visibility and awareness of the individual using the helmet.

In accordance with another aspect of the invention, a single wiring harness can be provided that extends between and connects the multiple lighted zones of the individual quadrants to each other. The wiring harness may also connect the lighted zones to a flashing system or processor which controls the flashing and/or other display functions and operations, and/or connect the lighted zones to a battery. The wiring harness may include conductors that extend primarily about a curvilinear path(s) between the lighted zones, without overlapping or intersecting each other and while lying against an inwardly facing surface of a shell of the helmet.

In accordance with another aspect of the invention, the lights include bulbs that are placed through corresponding holes that are provided in the helmet shell. The bulbs may extend only modestly beyond an outer surface of the helmet shell. In preferred embodiments, the outermost surfaces of the bulbs extend only modestly from, or are nearly flush or flush with the outer surface of the helmet shell. This makes the presence of light elements in the helmet relatively inconspicuous when the lights are not activated, making the helmet at such times look, in outward appearance, very similar to or the same as current helmets that do not incorporate lights. This is potentially an important innovation in an advancement toward encouraging user acceptability of light incorporating helmets, wherein helmet users may not want a conspicuous set of lights protruding from their helmet when it is not activated, for aesthetic reasons and corresponding reasons of social acceptability, noting that previous helmets incorporating lights and previous light elements that are intended to be reversibly attached to helmets have potentially not gained commercial acceptance because of this limitation.

In accordance with another aspect of the invention, the bulbs are friction fit into or otherwise snuggly housed in the holes in the helmet shell. The helmet shell material that is concentrically outside of and adjacent the holes in the helmet shell may act as a mounting shoulder or surface against which part of the bulb abuts. Correspondingly, the bulbs may be sandwiched between the helmet shell and a liner of the helmet, whereby the bulbs may be maintained in such holes by the liner preventing incidents of axial withdrawal of the bulbs in an inward direction or into an inner cavity of the helmet. In some embodiments, such backing of the bulbs by the liner holds the bulbs in a somewhat floating manner within the holes, in which slight clearances may be provided between the inner surfaces of the holes and the outer surfaces of the bulbs, instead of a friction or other tight fit therebetween. In such implementations, the bulbs may be biasingly held in the holes from behind by the liner, and mounted so as to allow the bulbs to move slightly in both radial and axial directions which, if a light makes contact or collides with an object, may allow the liner to deflect somewhat and accommodate such floating movement of the bulb. In some instances, this may allow the bulb to float or move further into the hole, for example, by partially compressing the liner at its supporting location, in preference to breaking the plastic or glass material of the bulb itself.

In accordance with another aspect of the invention, one or more batteries are provided within the helmet so as to be easily accessible and removable or replaceable by the user. This allows a user to remove the battery for recharging the battery outside of the helmet, if desired, noting that a charging port or other suitable electrical input may also be provided within the helmet for embodiments that are configured to charge the battery while it remains in the helmet.

In accordance with yet another aspect of the invention, the battery may be a lithium-ion battery and can have a thickness dimension that is less than about 10 mm, optionally less than about 5 mm. The battery or batteries may have length and/or width dimensions that are less than about 60 mm, optionally, less than about 40 mm and may have a single or combined capacity of at least about 800 mAh, optionally, at least about 900 or 1000 mAh. In some implementations, the battery may be a 9v, AA, or AAA battery or batteries.

In accordance with another aspect of the invention, the battery and/or flashing system or processor are housed between the helmet shell and the helmet liner, at or near a back and lower portion of the helmet. Providing the battery and/or flashing system or processor at a rearward and lower portion(s) of the helmet, the center of gravity of the helmet is likewise moved rearward and lower, as compared to if such components were mounted elsewhere in the helmet. This positions the center of gravity closer to the wearer's neck which may provide a relatively more desirable perceived weight for the wearer and correspondingly enhance comfort. In some implementations, multiple batteries are provided in the helmet. Like single battery implementations, the multiple battery versions are preferably mounted to rearward and lower portions of the helmet. In some implementations, the battery or batteries, the flashing system or processor, the wiring harness, and the lights or bulbs are provided in a symmetrical manner about a longitudinal axis or centerline of the helmet, such that the helmet defines a substantial transverse or side-to-side symmetry or even distribution of weight.

BRIEF DESCRIPTION OF THE DRAWINGS

The drawings illustrate the best mode currently contemplated of practicing the present invention.

In the drawings.

DETAILED DESCRIPTION

Various embodiments of an illuminated safety helmet will now be described that achieve these and many other goals, it being understood that other configurations may be provided that fall within the scope of the present invention. Such exemplary embodiments of the illuminated safety helmet of the present invention are illustrated in the accompanying drawings in which like reference numerals represent like parts throughout the disclosure.

Figure 1:
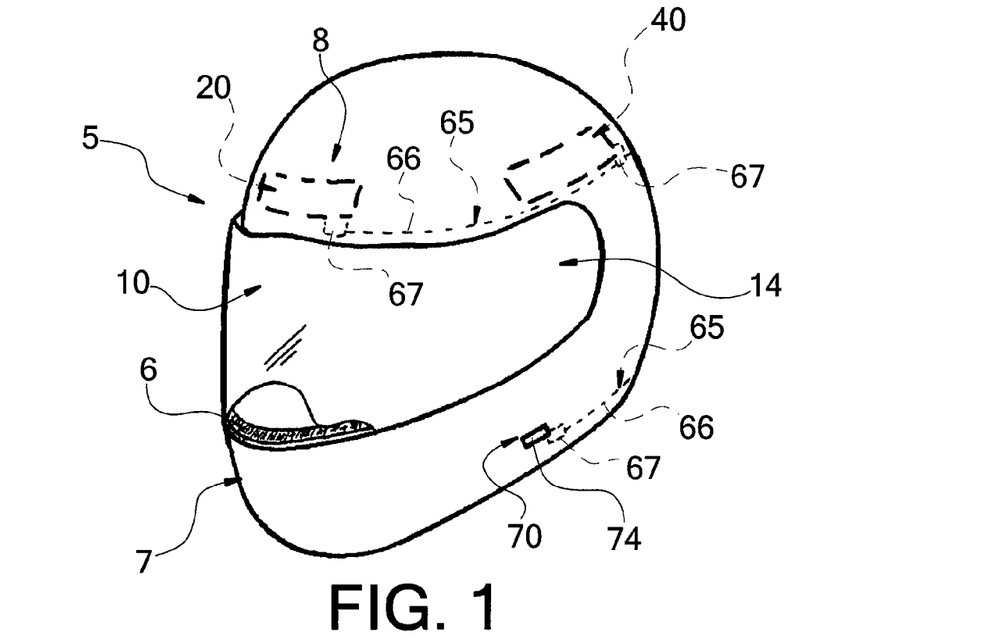
FIG. 1 is a front pictorial view of a first embodiment of an illuminated safety helmet of the present invention.
Figure 2:
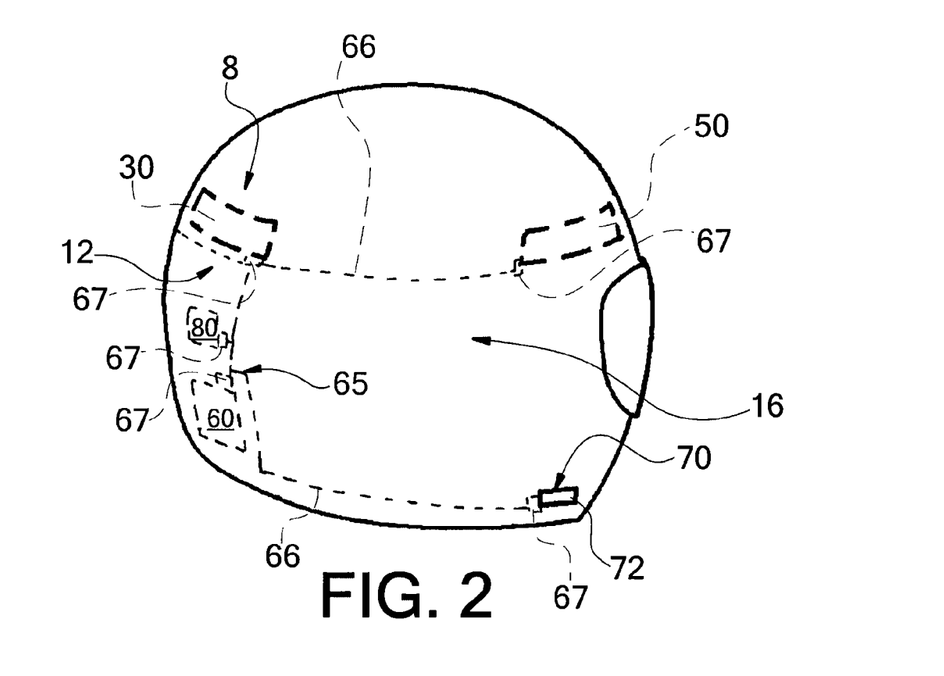
FIG. 2 is a back pictorial view of the illuminated safety helmet of FIG. 1.
Figure 7:
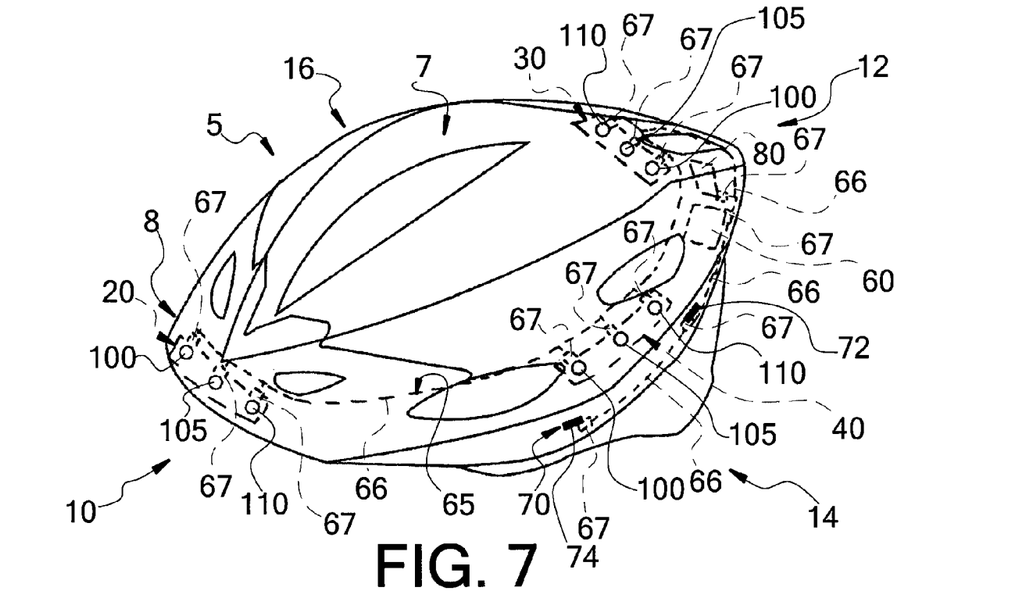
FIG. 7 is a front pictorial view of a fourth embodiment of an illuminated safety helmet of the present invention.
Figure 8:
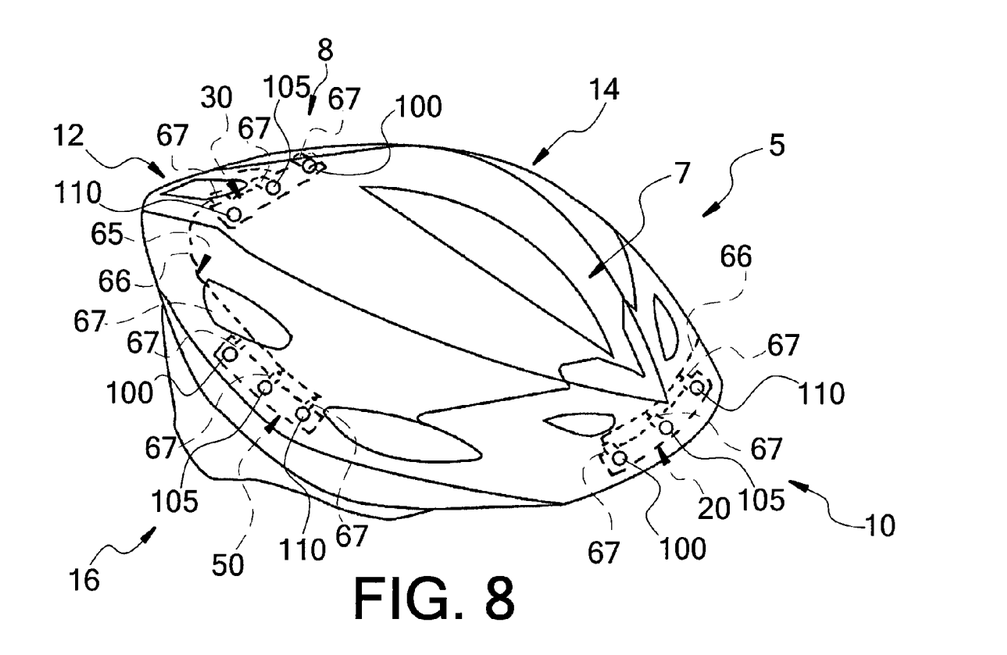
FIG. 8 is a back pictorial view of the illuminated safety helmet of FIG. 7.
Figure 9:
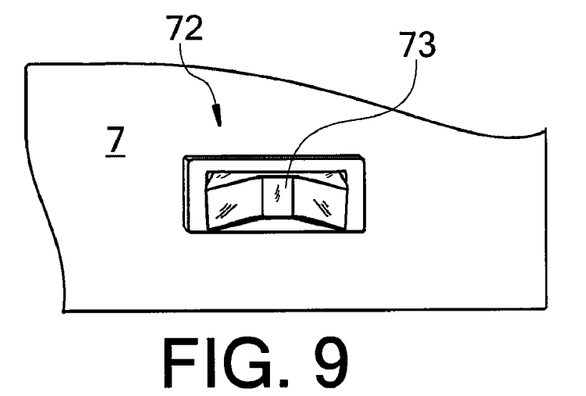
FIG. 9 is a close-up pictorial view of a selector incorporated into an illuminated safety helmet of the present invention.
Figure 10:
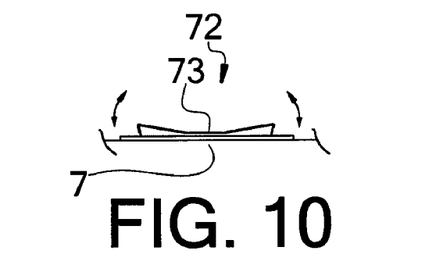
FIG. 10 is a side elevation view of the selector of FIG. 9 in a neutral position.

FIGS. 1 and 2 show an illuminated safety helmet that is configured as a motorcycle helmet or helmet 5. Helmet 5 includes an energy-absorbing protective liner 6 (FIG. 1) that is nested in a shell 7, and a lighting system 8. Lighting system 8 includes multiple areas from which visible radiation can be emitted and that are conveniently referred to herein as lighted zones 20, 30, 40, and 50, along with a battery 60, a user interface 70, a flashing system 80, and a wiring harness 65 that operably connects the various components to each other. The lighting system 8 is configured to efficiently convey powerful visual stimulus that commands attention from potential viewers by creating a visual effect which combines color discontinuity and display. Namely, from each of the multiple lighted zones 20, 30, 40, and 50, the lighting system 8 can provide a visual display that is conspicuous in multiple aspects by, for example, blinking or flashing while at the same time changing colors that are emitted from the multiple lighted zones 20, 30, 40, and 50. Referring generally now to FIGS. 3-8, FIGS. 3-6 show other embodiments of motorcycle helmets 5 incorporating lighting system 8 and FIGS. 7 and 8 show lighting system 8 incorporated into a bicycle helmet 5.

The embodiments illustrated are merely exemplary, noting here again that helmet 5 can be configured as a safety helmet for use at hazardous jobsites or while road and off-road bicycling, skiing, snowboarding, inline skating, roller skating, and/or other activities.

Referring now to FIGS. 1-4, lighted zones 20, 30, 40, and 50 are integrated into an outer shell 7 of the helmet 5 and are provided at distinct segments or portions thereof, namely, the front 10, back 12, and left and right sides 14 and 16 that are defined at corresponding quadrants about an outer surface of the helmet 5. Lighted zones 20, 30, 40, and 50 of this embodiment are provided in the upper portion of the helmet 5, being above a visor of the helmet 5.

It is, of course, appreciated that the lighted zones 20, 30, 40, and 50 can be located elsewhere and their particular locations are selected based on, for example, the particular shape and configuration of the helmet 5, the desired placement thereupon, and/or other factors. For example, instead of being provided in the upper portion of helmet 5, like the embodiment of FIGS. 1-4, the lighted zones 20, 30, 40, and 50 can be provided in a lower portion of the helmet 5, for example, below the visor or adjacent the opening at the bottom of the helmet through which the wearer inserts his or her head. Such placement could be considered similar to the placement of the lighted zones 20, 30, 40, and 50 on the bicycle helmet of FIGS. 7 and 8, which are closer to a bottom edge of the helmet shell 7. Optionally, some of the lighted zones 20, 30, 40, and 50 can be provided in the upper portion while others can be provided in the lower portion of helmet 5, as seen in the helmet 5 of FIG. 5.

In yet other embodiments, at least one of the lighted zones 20, 30, 40, and 50 is provided in both of or spans between the upper and lower portions of the helmet 5. Regardless of the particular locations of the lighted zones 20, 30, 40, and 50, preferably, the shell of helmet 5 is substantially devoid of lighting devices or other sources of illumination or light emissions outside of the lighted zones 20, 30, 40, and 50.

Referring now to FIGS. 3-8, the lighting system 8 controls the lighted zones 20, 30, 40, and 50 so that at least one and preferably each of them emits light in a variable manner, so as to define a variable illumination from such at least one of the lighted zones 20, 30, 40, and 50. In some embodiments, variable illumination is achieved by, for example, varying which one or which ones of multiple colored lights are illuminated within a brief period of time and in each of the lighted zones 20, 30, 40, and 50. Doing so preferably varies the illumination by changing at least two of the following in each zone that is activated at that time, (i) its color of light emission, (ii) its position of light emission, (iii) its intensity of light emission, or (iv) its rate of light emission and non-emission, in each zone 20, 30, 40, and 50. As one example, within each zone 20, 30, 40, and 50, light moves within the zone 20, 30, 40, and 50 and changes color within the zone 20, 30, 40, and 50. Changes of color(s) also include how or where, within each zone, the particular color(s) is presented, whereby changes of color and color variation include, e.g., any change in the color of illumination, the groups of colors that are simultaneously illuminated, or the location of a color within the zone.

Regarding the multiple colored light emission, this may be accomplished by multiple lights or bulbs that each emits a different color, such as bulbs 100, 105, and 110 of these embodiments. Optionally, a single light or lighting device, which is configured to emit a variable or multiple colored light radiation, may be provided at each of the lighted zones 20, 30, 40, and 50. The size of the single light or lighting device, or the overall area occupied by the multiple individual bulbs 100, 105, and 110, generally defines outermost dimensions and perimeter shapes of the lighted zones 20, 30, 40, and 50.

Regardless of the particular size and shape of the individual lighted zones 20, 30, 40, and 50, they are, preferably, spaced relatively far from each other, that is, far enough from each other so that at least one of the lighted zones is visible from any viewing angle around the perimeter of the helmet 5 while, preferably, having no more than about two or three zones that are visible from any given viewing angle. For example, a distance defined between adjacent lighted zones 20, 30, 40, and 50 may be at least about two times, optionally, at least about three times or at least about four times, greater than a width and/or height of each of the lighted zones 20, 30, 40, and 50. Such spacing and individual controllability of the lighted zones 20, 30, 40, and 50 allow a wearer of the helmet 5 to deactivate individual ones of the lighted zones 20, 30, 40, and 50 so as to prevent emission of light from an entire quadrant(s) of the helmet 5. This correspondingly prevents a display of light in the direction(s) that the particular quadrant(s) faces, as desired by the wearer.

Figure 5:
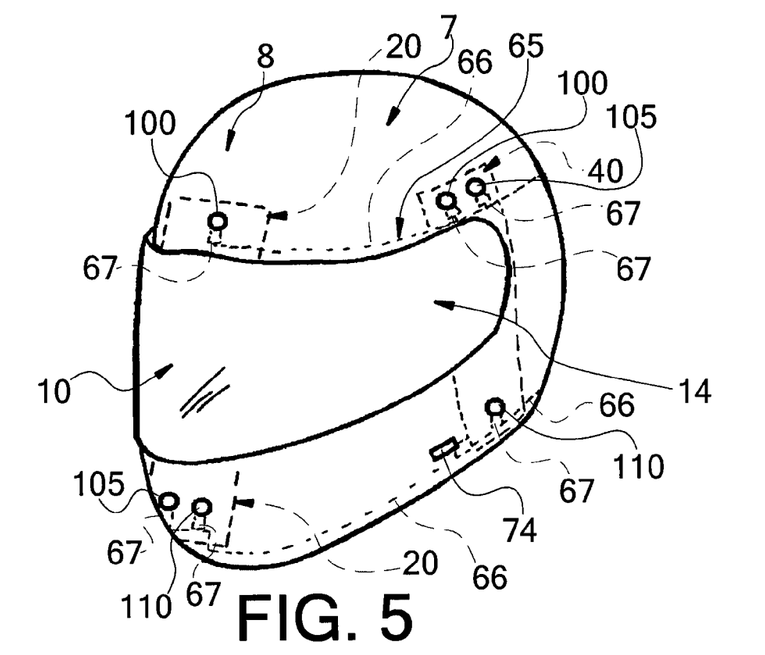
FIG. 5 is a front pictorial view of a second embodiment of an illuminated safety helmet of the present invention.

Referring now to FIG. 5, in this embodiment, the lighted zones 20, 30, 40, and 50 are taller than in the other illustrated embodiments because some of the bulbs 100, 105, and 110 in each of the lighted zones 20, 30, 40, and 50 are vertically spaced from the other bulbs. For example, within the front lighted zone 20, bulbs 100 and 105 are mounted above the visor 14 and bulb 110 is mounted below the visor 14. Within the side lighted zone 40, bulb 100 is mounted higher than the visor 14, whereas bulbs 105 and 110 are mounted lower than the visor 14.

Figure 6:
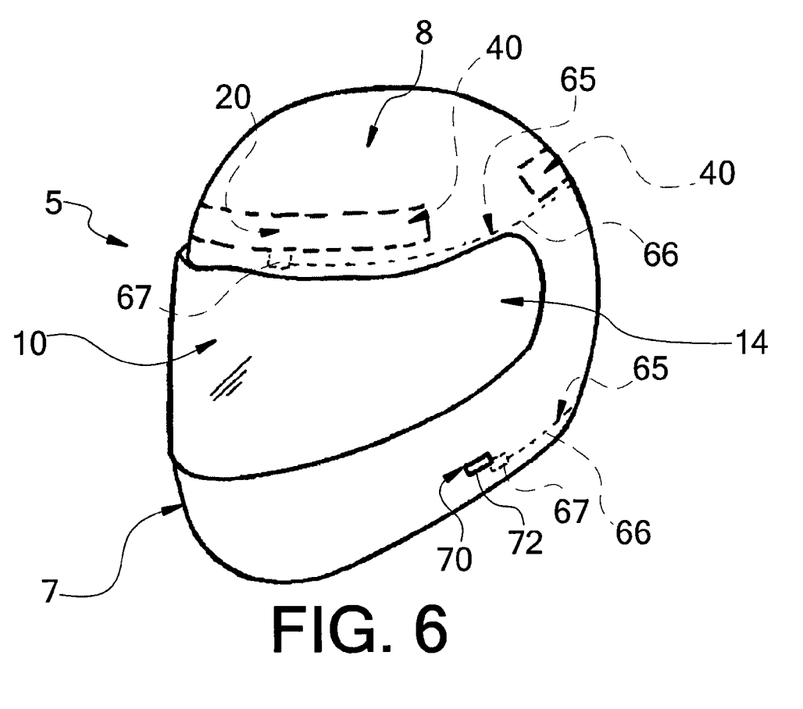
FIG. 6 is a front pictorial view of a third embodiment of an illuminated safety helmet of the present invention.

Referring now to FIG. 6, in this embodiment, some of the lighted zones 20, 30, 40, and 50 extent, nearly extend into, or somewhat merge with other lighted zones, so that a pair of lighted zones is defined. Even in this embodiment, at least one or more of the bulbs 100, 105, 110 will be visible from all angles around or about the helmet 5.

Referring again to FIGS. 3-8, electrical power for illuminating the lighted zones 20, 30, 40, and 50 is provided by one or more batteries 60. Battery 60 is any of a variety of suitable batteries, including, but not limited to 9v, AA, or AAA batteries. In some embodiments, battery 60 is a lithium-ion battery, such as those having flat and rectangular housings or round housings like CR2450 coin cells, and/or others. The capacity of battery 60 is selected based on the intended per charge life duration, in light of the power demands of the lighted zones 20, 30, 40, and 50. For example, the battery 60 can have a capacity of at least about 800 mAh, optionally, at least about 900 mAh or 1000 mAh.

In some embodiments, battery 60 has a thickness dimension that is less than about 10 mm, optionally, less than about 5 mm. The battery 60 can also have length and/or width dimensions that are less than about 60 mm, optionally, less than about 40 mm. Regardless of the particular dimensions of battery 60, the battery 60 is mounted within the helmet in a manner that allows easy access to the battery 60 and removal from the helmet 50. In the embodiments of FIGS. 1 and 2, the battery 60 is housed between the helmet liner 6 (FIG. 1) and shell 7, at the back 12 of the helmet 5 and toward its lower edge. For embodiments that include a single battery 60, it is preferably mounted upon a longitudinally extending centerline of the helmet 5. For embodiments that include multiple batteries 60, the batteries 60 are preferably mounted either directly upon the centerline or transversely spaced equally from the centerline, in a manner that substantial transverse or side-to-side symmetry or even distribution of weight that is attributable to the multiple batteries 60.

Still referring to FIGS. 3-8, wiring harness 65 includes multiple conductors 66 and terminals 67 that operably connect to the battery 60, the lighted zones 20, 30, 40, and 50, user interface 70, and flashing system 80 to each other. Like the battery 60, the wiring harness 65 is preferably sandwiched between the liner 6 (FIG. 1) and shell 7 layers of the helmet 5.

Figure 3:
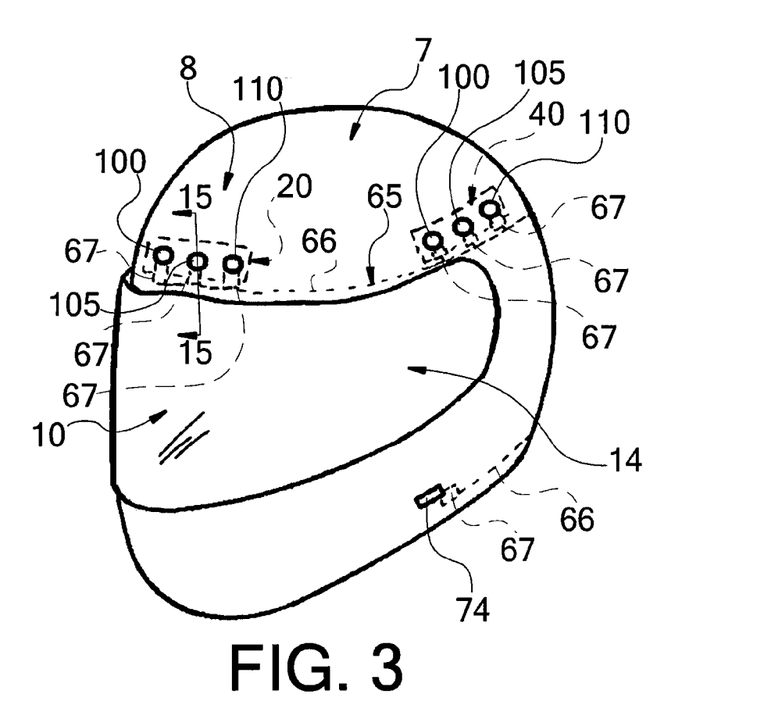
FIG. 3 is a front pictorial view of a variant of the illuminated safety helmet of FIG. 1.
Figure 4:
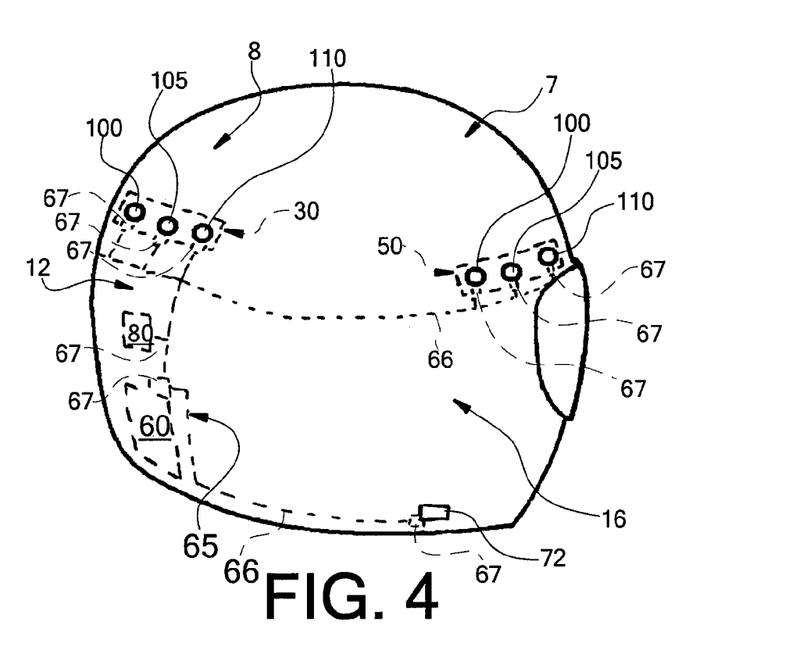
FIG. 4 is a back pictorial view of the illuminated safety helmet of FIG. 3.

User interface 70 is configured to allow a wearer of helmet 5 to selectively activate the lighted zones 20, 30, 40, and 50, energizing the zones with power from the battery 60. User interface 70 includes a selector 72 and an on-off switch 74. As seen in FIGS. 7 and 8, the selector 72 and on-off switch 74 are mounted on the left side 14. In the embodiment of FIGS. 3 and 4, selector 72 is mounted to a first side of the helmet 5 and an on-off switch 74 is mounted to an opposing side of the helmet. The selector 72 and on-off switch 74 of this embodiment are mounted near the bottom edge of the helmet, below the visor, and slightly in front of a hinge that attaches the visor to the helmet. The on-off switch 74 is operably connected, by way of the wiring harness 65, to the battery 60, flashing system 80 and thus also to the lighted zones 20, 30, 40, and 50, and is configured to turn the entire lighting system 8 on and off. Selector 72 is also connected, by way of the wiring harness 65, to the flashing system 80.

Selector 72 can be any of a variety of buttons, switches, and/or other user inputs or user interface devices that can send a signal to the flashing system 80 allowing the wearer of helmet 5 to input which of the lighted zones 20, 30, 40, and 50 to activate and which to deactivate. For embodiments of helmet 5 in which the flashing rates or patterns and light intensities are controllable, the selector 72 is also configured to select between such various modes of display of the lighting system 8. Selecting a mode of display or an activation or deactivation of the lighting system 8 can be accomplished by, for example, sequentially pushing a button of the selector 72 multiple times, physically changing a position of a switch of the selector 72, and/or otherwise, depending on the particular configuration of the selector.

Figure 11:
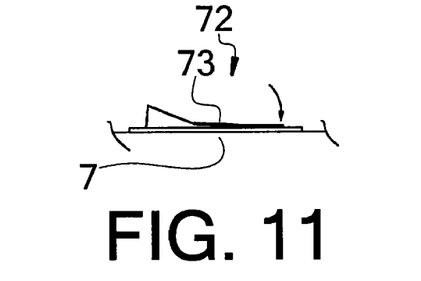
FIG. 11 is a side elevation view of the selector of FIG. 9 in a first depressed position.
Figure 12:
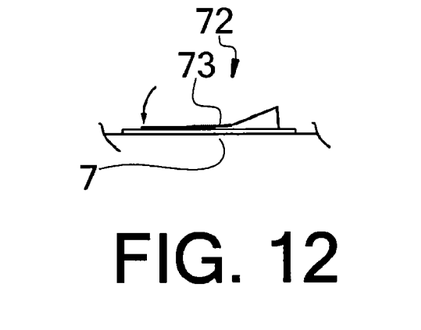
FIG. 12 is a side elevation view of the selector of FIG. 9 in a second depressed position.

Referring now to FIGS. 4 and 9-13, in these preferred embodiments, each of selectors 72 and on-off switches 74 is a three-position rocker switch which allows for numerous operational permutations of activation and deactivation of the lighted zones 20, 30, 40, and 50, for example, allowing per-quadrant deactivation(s). Each three position switch has a neutral or central position, seen in FIG. 10, and forward and rearward depressed or actuated switch positions as seen in FIGS. 11 and 12, respectively. The three position switch provides tactilely perceptible indication of each of its three positions, whereby a wearer of helmet 5 can easily determine which position the switch is in, by feel alone. Stated another way, a user can tell by feeling the selector 72 and on-off switch 74 which position it is in. If the selector 72 and/or on-off switch 74 has both its front and back ends of its rocker 73 raised with respect to its surrounding surfaces, then it is in the central position. If only the back end of the rocker 73 of selector 72 and/or on-off switch 74 is raised with respect to its surrounding surfaces, then the front is pushed down so that it is in the forward switched position. Correspondingly, if only the front end of the rocker 73 of selector 72 and/or on-off switch 74 is raised with respect to its surrounding surfaces, then the back is pushed down so that it is in the rearward switched position.

Figure 13:
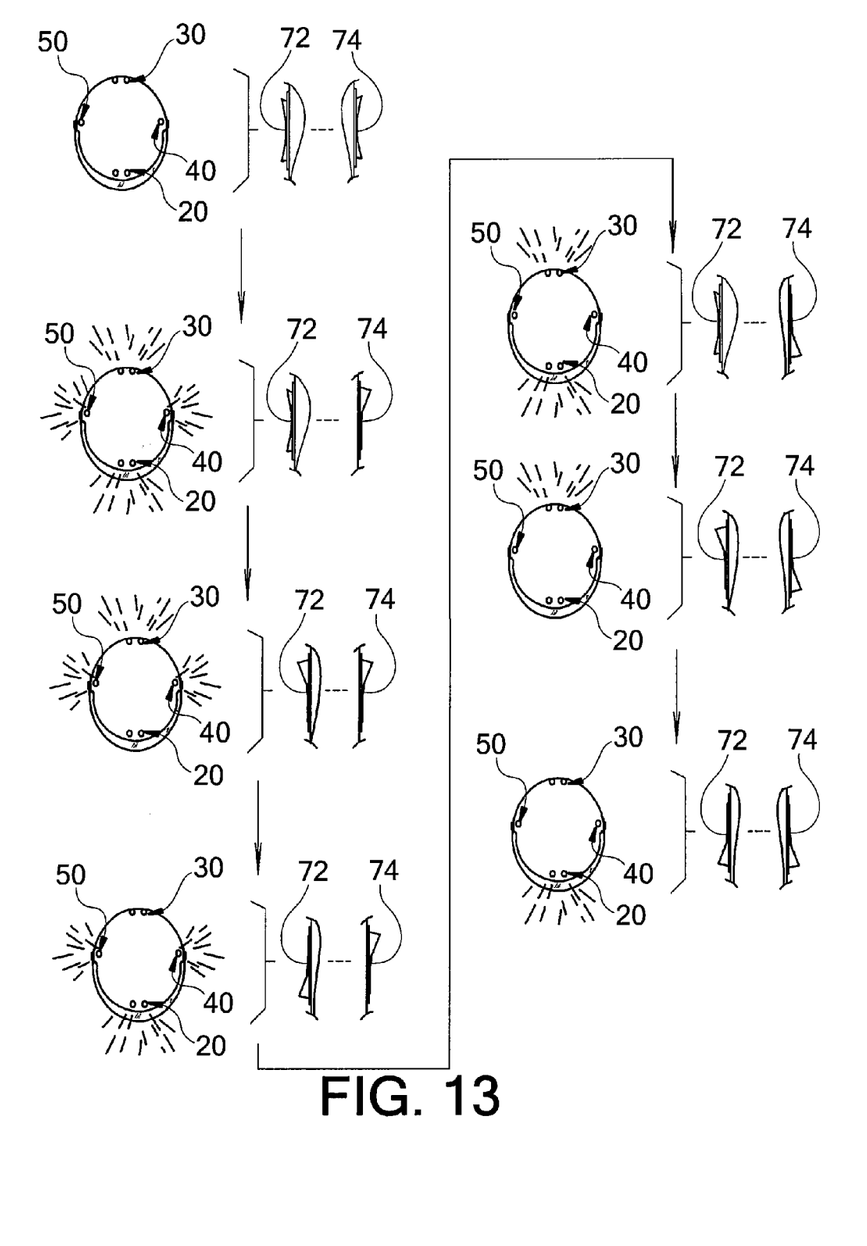
FIG. 13 is a flow chart showing, as top plan views, various states of activation and deactivation of the lighted zones of the illuminated safety helmet of FIG. 5.

Seen best in FIG. 13, in this embodiment, when the on-off switch 74 is in the central position, the entire lighting system 8 is turned off, in other words all of the lighted zones 20, 30, and 40 are deactivated. When the on-off switch 74 is pressed into the forward switched position and the selector remains in the central position, then all of the lighted zones 20, 30, and 40 emit a variable illumination. This is the typical or default operating state of the helmet 5, in which it coveys variable illumination in generally all directions around the helmet 5, such that the variable illumination is visible from all angles or vantage points around it.

Referring yet further to FIG. 13, if the on-off switch 74 is left in the forward position and the selector 72 is pressed into the forward switched position, then the front lighted zone 20 is deactivated while the remaining lighted zones 30, 40, and 50 emit the variable illumination(s) therefrom. When the on-off switch 74 is left in the forward position and the selector 72 is pressed into the rearward switched position, then the back lighted zone 30 is deactivated while the remaining lighted zones 20, 40, and 50 emit the variable illumination(s) therefrom.

Still referring to FIG. 13, the three operating states schematically shown on the right side of the drawing figure show the on-off switch 74 after being pressed into its rearward switched position. Moving the on-off switch 74 to such rearward switched position deactivates the side lighted zones 40, 50. When the on-off switch 74 is in the rearward switched position and the selector 72 is in the central position, then the front and back lighted zones 20, 30 remain activated while the side lighted zones 40, 50 are deactivated. When the on-off switch 74 is in the rearward switched position and the selector 72 is in the forward switched position, then the rear lighted zone 30 remains activated while the front and side lighted zones 20, 40, and 50 are deactivated. When the on-off switch 74 is in the rearward switched position and the selector 72 is in the rearward switched position, then the front lighted zone 20 remains activated while the back and side lighted zones 30, 40, and 50 are deactivated. It is, of course, appreciated that in some alternative embodiments, the side lighted zones 40, 50 need not be deactivated in unison but may be configured for deactivation separate from each other.

In alternative embodiments, selector 72 and on-off switch 74 are not three position rocker switches but are instead sliding-type switches. For example, the selector 72 can be a three-position slide switch with a slider that has a tab for manipulation by the user. By pushing the tab of the slider in forward or rearward directions, the slider is moveable between (i) a central default position, (ii) a forward position, and (iii) a rearward position. Like the other versions discussed above, the selector 72 is configured and cooperates with other components of the lighting system 8 so that when the slider is in the central position, all of the lighted zones 20, 30, 40, and 50 are energized or activated, with at least one and preferably all of them variably illuminating. When the slider is slid to the forward position, the front lighted zone 20 is deactivated. When the slider is slid to the rearward position, the rear lighted zone 30 is deactivated. This allows the selector 72 to provide a tactile indication to the wearer of the helmet's mode of operation at any given time. In other words, while wearing the helmet 5, the wearer can feel the position of the slider, feeling whether it is in the central default, forward, or rearward position, in order to determine whether all of the lighted zones 20, 30, 40, and 50 are energized or activated, the front lighted zone 20 is deactivated, or the rear lighted zone 30 is deactivated, respectively.

In some alternative embodiments, multiple selectors 72 are provided, optionally, a selector 72 is provided for each of the lighted zones 20, 30, 40, and 50. When a selector 72 is provided for controlling each of the lighted zones 20, 30, 40, and 50, then the four selectors 72 are spaced from each other, each being located within or near the respective lighted zone 20, 30, 40, and 50 that it controls. For example, four selectors 72 can be provided, one mounted upon each of the front 10, back 12, and left and right sides 14 and 16 of the helmet. In such alternative embodiments, the selector 72 is configured to provide some sort of tactile indication of whether its corresponding lighted zone 20, 30, 40, and 50 is activated or deactivated. This may be accomplished by configuring each selector 72 as a push-button switch that stays in either a retracted or extended position depending on whether the switch is open or closed, or a toggle switch that stays in either an upwardly flipped or downwardly flipped position depending on whether the switch is open or closed and thus whether the corresponding lighted zone 20, 30, 40, and 50 is activated or deactivated. This allows a wearer of helmet 5 to be able to tell which of the lighted zones 20, 30, 40, and 50 are activated or deactivated at any given time by touching the selectors 72 and feeling whether they are in the activated or deactivated position or configuration, and therefore without having to remove the helmet or otherwise visually inspect the activated/deactivated status of the lighted zones 20, 30, 40, and 50.

Referring again to FIGS. 3-8, regardless of the particular number and location of the selector 72, on-off switch 74, the various components of the user interface 70 provide the mechanism(s) to input or otherwise convey the wearer's operational desires into the flashing system 80 which controls the lighted zones 20, 30, 40, and 50 in a corresponding manner, allowing individual activation of the lighted zones 20, 30, 40, and 50 on a per-quadrant basis. Flashing system 80 can be at least partially incorporated into the lighted zones 20, 30, 40, and 50 themselves, for example, by providing flashing or blinking LEDs which is explained in greater detail elsewhere herein. Optionally, the flashing system 80 is separate from but cooperates with the lighted zones 20, 30, 40, and 50, causing them to illuminate in a non-continuous manner.

The flashing system 80 can be configured as a single component that controls the lighted zones 20, 30, 40, and 50 when the user activates the system 8 with the user interface 70. In some embodiments, the flashing system 80 includes an automotive style flasher module that has been configured to suitably operate based on the particular performance characteristics and configuration of battery 60. Namely, some embodiments of flashing system 80 include an alternating flasher to illuminate multiple bulbs or lights of different colors, described in greater detail elsewhere herein, in an alternating flashing manner. Such alternating flasher of flashing system 80 can have any of a variety of suitable configurations, including, but not limited to, current sensitive bimetal flashers, hybrid flashers that have a control circuit and electromechanical relay, and solid state alternating flashers. In yet other embodiments, the flashing system 80 is microprocessor based, whereby the flashing system 80 includes various suitable computing resource(s) such as, for example, inputs and outputs that are operably connected to a memory device and a microprocessor with an operating system that is configured to perform the desired flashing and/or other functions. The flashing system 80 can be at least partially incorporated into the lighted zones 20, 30, 40, and 50, for example, as an IC (integrated circuit), optionally within one or more bulbs 100, 105, and 110 that provide the flashing or blinking multiple colored illuminations that are displayed by the lighted zones 20, 30, 40, and 50.

Regardless of whether the flashing system 80 is provided within the bulbs 100, 105, and 110 themselves, elsewhere in the lighted zones 20, 30, 40, and 50, or as a separate system, the bulbs 100, 105, and 110 can be any of a variety of bulbs or other devices that can emit light radiation in a suitable manner, preferably, in a manner that appears discrete, sharp or focused, and highly intense instead of appearing diffused or soft. For example, the bulbs 100, 105, and 110 may be LEDs (light emitting diodes), or blinking or flashing LEDs if the flashing system 80 is incorporated thereinto.

Referring yet further to FIGS. 3-8, each of the bulbs 100, 105, and 110 emits a different color with respect to the others, for example, with bulb 100 emitting a blue colored light, bulb 105 emitting a red colored light, and bulb 110 emitting a white colored light, while noting that this discussion of three different colored bulbs 100, 105, and 110 is done for ease of explanation only. The lighted zones 20, 30, 40, and 50 can instead include more bulbs and/or emit more colors, optionally fewer. In some embodiments, two bulbs 100 and 105 are used for emitting two colored lights. In yet another example, a single bulb 100 is used that can, itself, emit two or more colored lights.

The bulbs 100, 105, and 110 have luminous intensity values that are selected so as to be readily visible by persons near the wearer of helmet 5 while also consuming suitably small amounts of power so that the battery 60 has a suitably long duration of charge or use life. The luminous intensity values are, in typical implementations, between about 1,000 mcd (millicandela) to about 18,000 mcd or greater. Particular luminous intensity values are selected based on, e.g., the particular intended battery use life, brightness, end-use environment, and/or other factors. It is further contemplated that different bulbs 100, 105, and 110 can have different luminous intensity values, optionally, variable luminous intensity values within each of the lighted zones 20, 30, 40, and 50. This allows an operator to select whether to display higher intensity light emissions or lower intensity light emissions, as desired. For example, a wearer can select a most visually conspicuous display (high intensity) while experiencing a heavy traffic situation, or select a display that uses less energy (low intensity) so as to prolong battery use life while experiencing a light traffic situation during a long ride in which such battery preservation may be desirable, explained in greater detail elsewhere herein.

Referring still to FIGS. 3-8, small distances separate the bulbs 100, 105, and 110 from each other, so that they are tightly grouped together within each of the lighted zones 20, 30, 40, and 50, whereby a visual effect is created in which it appears that multiple colors are being emitted from a single source, for example, each of the lighted zones 20, 30, 40, and 50. These embodiments include bulbs 100, 105, and 110 that are spaced from each other by distances that are less that two times the diameter of each of the bulbs 100, 105, and 110.

Alternatively, the bulbs 100, 105, and 110 can be even closer to each other, for example, abutting each other or immediately adjacent. Optionally, the bulbs 100, 105, and 110 are spaced further from each other, for example, being spaced from each other by distances that are about three times, four times, or fives times the diameter of each of the bulbs 100, 105, and 110 while preferably maintaining a close enough proximity to each other so that it appears that multiple colors are being emitted from a single source when viewed from a distance of about 10 feet, 20 feet, or further. Furthermore, although the embodiments of FIGS. 3-4 and 7-8 show the bulbs 100, 105, and 110 as being mostly horizontally aligned with each other, it is, of course, appreciated that they could define other positional configurations or patterns, for example, but not limited to, being vertically aligned with each other, having more or fewer bulbs as described elsewhere, and that are provided in multiple columns or rows as seen in the embodiment of FIG. 5, optionally arranged to be staggered with respect to each other or define recognizable geometric shapes, and/or define other patterns or configurations.

Figure 15:
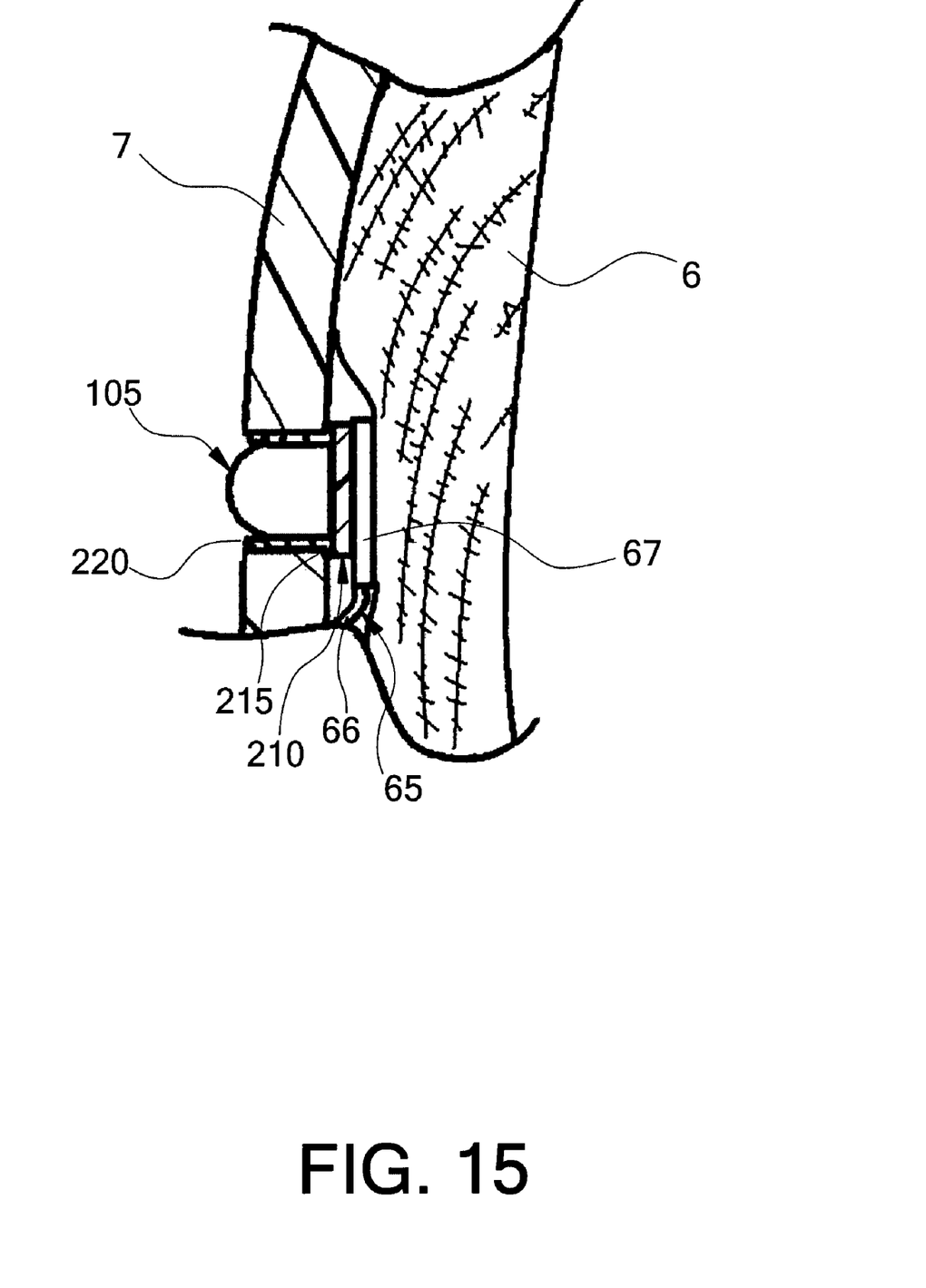
FIG. 15 is a cross-sectional view of a portion of the illuminated safety helmet of FIG. 3, taken at the line 15-15 in FIG. 3

Referring now to FIGS. 3 and 15, the bulbs 100, 105, and 110 are LEDs that have emission or beam angles of about 35 degrees to about 55 degrees, allowing them to overlap each other at a distance that is radially spaced from the outer surface of the shell 7, for example, a distance of more that about 3 feet or more than about 5 feet, and without compromising a line of sight of or projecting glare(s) toward the helmet wearer. Bulbs 100, 105 and 110 each has a lens or cover 200 with a lip 210 that defines a shoulder 215 extending radially and perpendicularly between the cover lip 210 and the remainder of the cover 200. The cover 200 defines an outer diameter thereof, which corresponds in magnitude to diameters of holes 9 that extend through the shell 7 and house the bulbs 100, 105, 110 therein. The particular size relationship of the cover 200 and hole 9 is defined by the particular type of fit that is selected for mounting the bulbs 100, 105, and 110 into the helmet 5, for example, the diameters closely corresponding in a friction fit embodiment while the diameters may differ to a greater extent when a clearance is desired between the shell 7 and cover 200.

Referring specifically to FIG. 15, a clearance between the shell 7 and cover 200 can be filled with a seal 220 which is shown with respect to bulb 105. Preferably, seal 220 is made from an elastomeric or other resilient material that can provide a watertight seal between the shell 7 and cover 200 of the bulb 100, 105, 110 while isolating the bulb 100, 105, 110 from the shell 7. This allows the bulb 100, 105, 110 to radially float within the hole 9 by allowing its side-to-side or bending movements to be translated into and absorbed by compressing the seal 220 at that location.

Still referring to FIG. 15, in some embodiments, the shoulder 215 abuts the inwardly facing surface of the shell 7, adjacent the hole 9, shown with respect to bulb 105. In this configuration, the shoulder 215 holds the bulb 105 in the helmet 5 by mechanically preventing the bulb 100, 105, 110 from falling axially entirely through the hole 9. From behind the bulb 105, the bulb 105 is held against the shell 7 by the liner 6 which can push against or support the inwardly facing end of the bulb or, as seen in this embodiment, push against or support a terminal 67 that connects the wiring harness 65 to contacts of the bulb 105. Since the liner 6 is made from an energy-absorbing compressible material, the liner 6 axially supports the bulbs 100, 105, 110 in a resilient manner whereby, if the bulbs 100, 105, 110 are bumped or pushed from outside of the helmet, the liner 6 may compress at its supporting location to accommodate inward movement of the bulbs 100, 105, 110 in preference to breaking the material of the cover 200.

Accordingly and still referring to FIG. 15, by supporting the bulbs 100, 105, 110 transversely with seal 220 and axially with liner 6, each of the bulbs 100, 105, 110 is isolated or mounted in a floating manner that allows multi-axial movement of the bulbs 100, 105, 110. This configuration may correspondingly protect the bulbs 100, 105, 110 by absorbing energy from certain shock-type impacts that might otherwise break the cover 200. This can be further enhanced by the particular mounting position of the bulbs 100, 105, and 110 with respect to the shell 7 of helmet 5. Preferably, the bulbs 100, 105, 110 extend only modestly beyond an outer surface of the shell 7. For example, an outermost surface of the bulbs 100, 105, 110 extends no more than about 5 mm, optionally no more than the bulb's diameter, outwardly beyond the outer surface of the shell 7. In other embodiments, the outermost surfaces of the bulbs 100, 105, 110 are flush or nearly flush with the outer surface of the shell 7, optionally recessed slightly behind the outer surface of the helmet shell 7.

In light of the above and referring again to FIGS. 1-8, during use, the helmet 5 defines at least two, and preferably four, lighted zones 20, 30, 40, and 50 that are spaced from each other and are provided upon its shell 7, being visible from all angles about the helmet 5. The lighted zones 20, 30, 40, and 50 are configured so that (i) at least one of the lighted zones 20, 30, 40, and 50 emits light in front of the helmet when activated, (ii) at least one of the lighted zones 20, 30, 40, and 50 emits lights in back of the helmet when activated, (iii) at least one of the lighted zones 20, 30, 40, and 50 emits light leftward of the helmet when activated, and (iv) at least one of the lighted zones 20, 30, 40, and 50 emits light rightward of the helmet when activated. Preferably, when each of the lighted zones 20, 30, 40, and 50 is activated, it emits light in a variable manner, so as to define a variable illumination emitted therefrom. This variable illumination manifests and is therefore observable within a time period that is no greater than about 5 seconds, for example between about 0.5-7 seconds but preferably within a range of about 3-5.5 seconds.

During use, helmet 5 realizes a unique synergy of the attention drawing effectiveness of the lighted zones 20, 30, 40, and 50, as combined with the overall aesthetic acceptability of the overall lighting system 8 and its integration into helmet 5. For example, the variable illumination from each lighted zones 20, 30, 40, and 50 is highly perceptible visual stimulus that easily draws attention thereto, while the lighting system 8, in its entirety and with respect to the overall helmet configuration 5, is substantially non-extravagant which correspondingly minimizes any social awkwardness attributably to its use. For example, by not providing an overly abundant number of lighting sources and/or by not providing an overly visually conspicuous mounting of the lighted zones 20, 30, 40, and 50, helmet 5 is able to minimize power usage by the lighting system 8, minimize gaudiness and social awkwardness associated with its wearing, minimize overall system complexity, while at the same time maximizing the attention drawing characteristics by implementing the variable illumination. Since each lighted zone 20, 30, 40, and 50 is configured to vary its illumination in at least two ways, and by suitably positioning the at least two zones upon the helmet, this configuration ensures that the individuals in the vicinity of the helmet wearer will see the two varying properties in the zone(s).

Figure 14:
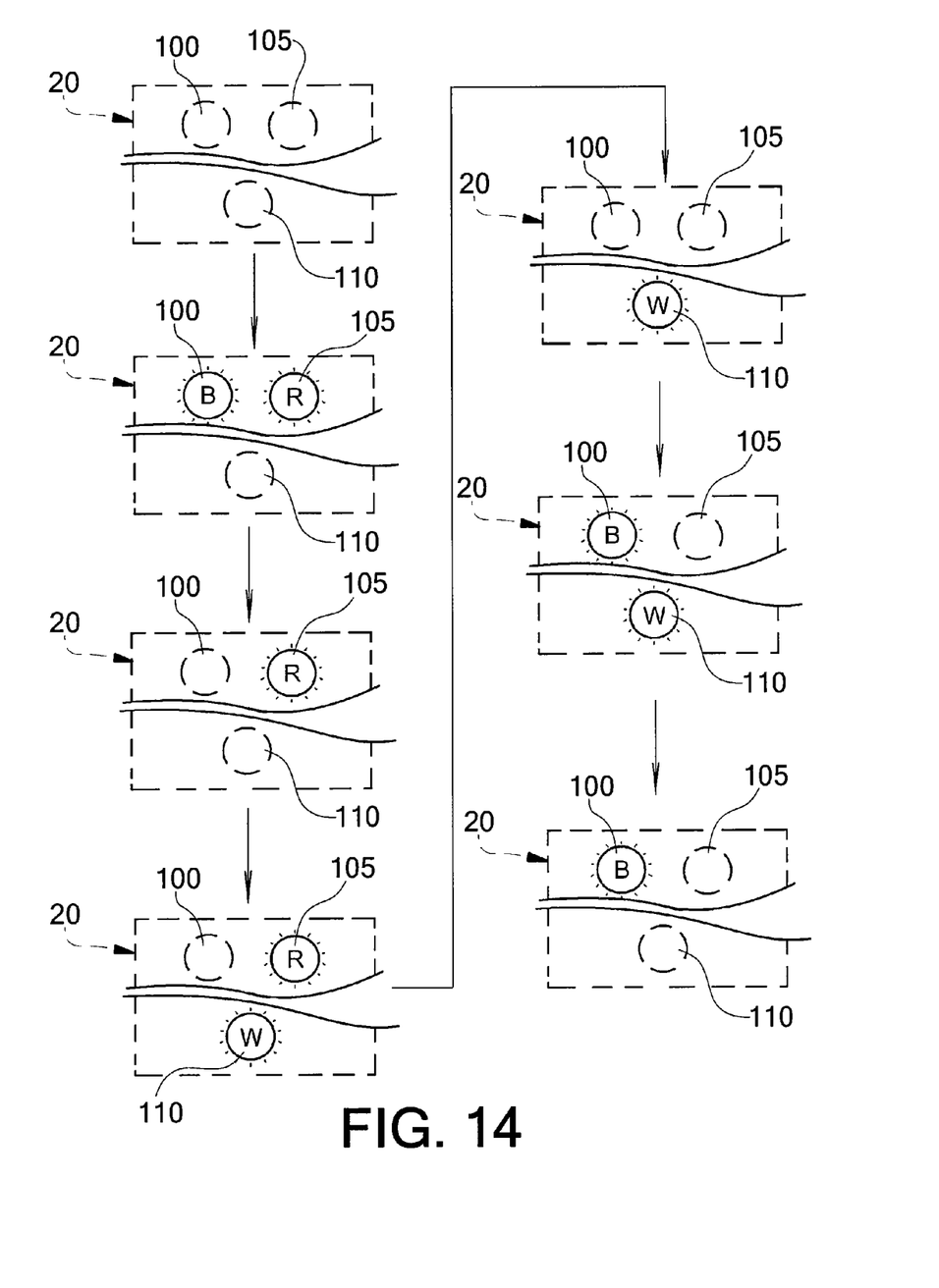
FIG. 14 is a flow chart that schematically shows a first pattern of variable illumination of the front lighted zone of the illuminated safety helmet of FIG. 5.

Referring now to FIG. 14, the flowchart shows a variable illumination scheme of one embodiment. The individual steps in the sequence of FIG. 14 occur within a brief period of time, for example in less than about five seconds and preferably less than one second, e.g., within about one-half second. When the helmet 5 is first turned on by way of the on-off switch 74 (FIG. 13), two of the three bulbs 100, 105, 110, namely upper bulbs 100 and 105 emit light, blue and red, respectively and signified by the letters "B" and "R." Then bulb 100 ceases emitting blue light "B" and only bulb 105 emits its red light "R." While bulb 105 continues to emit its red light "R," the lower bulb 110 emits a white light "W" therefrom. Bulb 105 ceases emitting its red light "R" such that just white light "W" is emitted from bulb 110. While bulb 110 continued to emit its white light "W," bulb 100 again emits blue light "B." Bulb 110 then turns off again leaving only bulb 100 emitting its blue light "B" and the sequence continued.

As another way of variably illuminating, each of the zones 20, 30, 40, and 50 can be configured to emit light from four locations within the zone, the locations being spaced from each other to generally define a rectangle. The zone 20, 30, 40, and 50 of one such rectangular embodiment can emit white lights from the left side and red lights from the right side. Then, during use, light is emitted in an alternating manner between pairs of diagonally aligned locations within the rectangle. For example, initially, a white light is emitted from an upper left corner and a red light is emitted from a lower right corner, simultaneously. Then, a red light is emitted from an upper right corner and a white light is emitted from a lower left corner, while the previously illuminated upper left and lower right corners go unlit. In this regard, even though the same two colors, red and white, are present substantially at all times during use, the location of a color within the zone changes or varies during use, along with position(s) within the zone 20, 30, 40, and 50, in this example within a time period of no more than 5 seconds. Yet other embodiments include, e.g., within a time period that is no greater than about 5 seconds, varying the light of each activated zone 20, 30, 40, 50 in at least two of (i) any change in the color of illumination, the groups of colors that are simultaneously illuminated, or the location of a color within a zone, (ii) position within the zone, (iii) rate of emission and non-emission, and (iv) illumination intensity and/or other changes that are visually perceptible characteristics.

As an example of a particular use of helmet 5 by a wearer that is a motorcycle driver that is riding without a passenger, the wearer used the user interface 70 to activate all of the lighted zones 20, 30, 40, and 50 by turning on the on-off switch 74 and ensuring that the rocker 73 of selector 72 is in the central position. Upon so doing, variable illumination emanates from all of the lighted zones 20, 30, 40, and 50. Then, if the wearer stops for fuel, the wearer can leave the helmet 5 secured to his or her head while deactivating all of the lighted zones 20, 30, 40, and 50 by merely turning off the on-off switch 74. If at some point the wearer picks up a two-up rider, whom will be seated directly behind the wearer on the same motorcycle, then the wearer may deactivate the back lighted zone 30 by moving the selector 72 to the rearward switched position. Doing so ensures that the lighting system 8 will not display directly into the two-up rider's eyes. If the two-up rider also is wearing a helmet 5, then the two-up rider may turn on their own on-off switch 74 and move the selector 72 to the forward switched position, deactivating the front lighted zone 20. Doing so may be beneficial for the two-up rider's enjoyment of the ride by preventing any reflection or glare from the back of the driver's helmet that would otherwise be caused by the activated front lighted zone 20. Accordingly, helmet 5 allows a pair of riders on a single motorcycle to, in combination between both of the riders, emit variable illuminations in forward, rearward, and both side directions, without having to transmit light toward each other.

Various alternatives are contemplated as being within the scope of the following claims particularly pointing out and distinctly claiming the subject matter regarded as the invention.

We hereby claim:

1. A safety helmet, comprising:
    a shell defining an outer surface thereof; and
    at least two separate lighted zones being provided on the outer surface of the shell and being spaced from each other, the at least two lighted zones being configured, such that,
        at least one of the at least two lighted zones emits light in front of the helmet when the at least one of the at least two lighted zones is activated;
        at least one of the at least two lighted zones emits lights in back of the helmet when the at least one of the at least two lighted zones is activated;
        at least one of the at least two lighted zones emits light leftward of the helmet when the at least one of the at least two lighted zones is activated;
        at least one of the at least two lighted zones emits light rightward of the helmet
    wherein each of the at least two lighted zones, when activated, emits an illumination that varies within a time period that is no greater than about 5 seconds, with respect to at least two of (i) the color or colors of illumination, the colors that are simultaneously illuminated, or the location of a color within the zone, (ii) the location of illumination within the zone, (iii) the rate of alternating between illumination and non-illumination within the zone, and (iv) illumination intensity within the zone.

2. The safety helmet of claim 1, wherein each of the lighted zones further comprises multiple bulbs, each of the multiple bulbs emitting a different color.

3. The safety helmet of claim 2, wherein multiple bulbs are LEDs (light emitting diodes).

4. The safety helmet of claim 2, wherein the multiple bulbs define outer surfaces thereof and the outer surfaces of the lights are mounted flush with respect to the outer surface of the shell.

5. The safety helmet of claim 2, wherein the multiple bulbs define outer surfaces that extend no more than about 5 mm outwardly beyond the outer surface of the shell.

6. The safety helmet of claim 2, wherein the multiple bulbs define outer surfaces that are recessed with respect to the outer surface of the shell.

7. The safety helmet of claim 1, further comprising a battery that is removably housed between the shell and a helmet liner that nests against an inner surface of the shell.

8. The safety helmet of claim 7, wherein the battery is adjacent a lower edge of the shell at a back portion thereof.

9. The safety helmet of claim 8, wherein the battery is has a thickness dimension that is less than about 10 mm.

10. The safety helmet of claim 8, wherein the battery is has a thickness dimension that is less than about 5 mm.

11. A safety helmet, comprising:
    a shell having an outer surface that defines opposing outwardly facing front and back sides and opposing outwardly facing left and right sides, thereof; and
    two or more light emitting zones provided on the outer surface of the shell and arranged such that when at least one of the two or more light emitting zones are activated, light is emitted to each of the front, back, left, and right sides of the helmet in a viriable manner; and
    wherein such variability occurs within a time period no greater than about 1 second, and comprises at least one of the following;
        (i) a change in a number of at least one of points, regions, and discrete areas of illumination within at least one of the two or more light emitting zones,
        (ii) a change in a location of at least one of points, regions, or discrete areas of illumination within at least one of the two or more light emitting zones and/or,
        (iii) a change in a color or colors that are at least one of independently and simultaneously illuminated within at least one of the two or more light emitting zones,
        (iv) a change in a location of a color or colors that are illuminated within at least one of the two or more light emitting zones, and
        (v) a change in at least one of an intensity and a presence of illumination within at least one of the two or more light emitting zones.

12. The safety helmet of claim 11, wherein each of the two or more light emitting zones further comprises multiple bulbs or lighting elements that are mounted in throughbores in the shell and do not extend outwardly beyond the outer surface of the shell by a distance of more than about 5 mm.

13. The safety helmet of claim 11, wherein at least one of the two or more light emitting zones is provided at each of the front, back, left, and right sides of the shell.

14. The safety helmet of claim 13, the helmet further comprising an on-off switch that activates or de-activates all of the two or more light emitting zones.

15. The safety helmet of claim 14, wherein the selector includes a switch that is movable between a first position in which one of the two or more light emitting zones is deactivated and a second position in which a second one of the two or more light emitting zones is deactivated.

16. The safety helmet of claim 15, the selector comprising a three position switch and wherein when the switch is in (i) a first position, all of the two or more light emitting zones emit light, (ii) a second position, a forward light emitting zone is deactivated, and (iii) a third position, a rearward light emitting zone is deactivated.

17. The safety helmet of claim 11, wherein each of the two or more light emitting zones includes at least one LED (light emitting diode), the helmet further comprising a liner that nests inside of the shell and resiliently supports the LED from inside of the helmet.

18. The safety helmet of claim 17, wherein the at least one LED extends through a hole in the shell and wherein a clearance is defined between the shell and the LED at the hole, the helmet further comprising a seal extending between the LED and the shell, within the clearance therebetween, the seal resiliently supporting the LED in the hole in a transverse direction.

19. A method of increasing the visibility of a motorcyclist, bicyclist, skateboarder, snowboarder, or skier to other individuals in the vicinity of the motorcyclist, bicyclist, skateboarder, snowboarder, or skier, the method comprising:

providing a helmet that has a shell defining an outer surface thereof; and at least two separate lighted zones being provided on the outer surface of the shell and being spaced from each other, the at least two lighted zones being configured, such that, at least one of the at least two lighted zones emits light in front of the helmet when the at least one of the at least two lighted zones is activated;

at least one of the at least two lighted zones emits lights in back of the helmet when the at least one of the at least two lighted zones is activated;

at least one of the at least two lighted zones emits light leftward of the helmet when the at least one of the at least two lighted zones is activated;

at least one of the at least two lighted zones emits light rightward of the helmet wherein each of the at least two lighted zones, when activated, emits an illumination that varies within a time period that is no greater than about 5 seconds, with respect to at least two of (i) the color or colors of illumination, the colors that are simultaneously illuminated, or the location of a color within the zone, (ii) the location of illumination within the zone, (iii) the rate of alternating between illumination and non-illumination within the zone, and (iv) illumination intensity within the zone.

\* \* \* \* \*